US012020282B1

United States Patent
Doke et al.

(10) Patent No.: US 12,020,282 B1
(45) Date of Patent: Jun. 25, 2024

(54) ADVERTISING EVALUATION USING PHYSICAL SENSORS

(71) Applicant: Amazon Technologies, Inc., Seattle, WA (US)

(72) Inventors: Abhay Doke, Boston, MA (US); Vinod Krishnan Kulathumani, Westborough, MA (US); Austin Reiter, Southport, CT (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/109,784

(22) Filed: Feb. 14, 2023

(51) Int. Cl.
*G06Q 30/02* (2023.01)
*G06Q 30/0204* (2023.01)
*G06Q 30/0242* (2023.01)
*G06T 7/70* (2017.01)
*G06V 10/26* (2022.01)
*G06V 10/70* (2022.01)

(52) U.S. Cl.
CPC ..... *G06Q 30/0244* (2013.01); *G06Q 30/0204* (2013.01); *G06Q 30/0246* (2013.01); *G06T 7/70* (2017.01); *G06V 10/26* (2022.01); *G06V 10/70* (2022.01); *G06T 2207/30201* (2013.01)

(58) Field of Classification Search
CPC ........... G06Q 30/0244; G06Q 30/0204; G06Q 30/0246; G06T 7/70; G06T 2207/30201; G06V 10/26; G06V 10/70
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 10,867,391 B2 * | 12/2020 | Edell | G06N 5/046 |
| 11,328,026 B2 * | 5/2022 | Nguyen | G06Q 50/01 |
| 2013/0284806 A1 | 10/2013 | Margalit | |
| 2019/0384857 A1 * | 12/2019 | Nguyen | G06F 16/951 |
| 2020/0104999 A1 * | 4/2020 | Edell | G06V 40/161 |

OTHER PUBLICATIONS

University of Chicago, 2d Object Detection and Recognition, by Yali Amit (Year: 2005).*

* cited by examiner

*Primary Examiner* — Breffni Baggot
(74) *Attorney, Agent, or Firm* — Lee & Hayes, P.C.

(57) ABSTRACT

Systems and techniques for displaying advertisements on a digital display and gathering impression and view data related to the advertisement that may be used to refine or score the advertisements for greater effectiveness. The impression and view data may be used to identify effective portions of advertisements and subsequently to train a machine learning model to predict impression data for advertisements that may be used to iteratively improve the advertisements.

20 Claims, 7 Drawing Sheets

ADVERTISING EVALUATION USING PHYSICAL SENSORS

BACKGROUND

Digital signage is the term that is often used to describe the use of an electronic display device, such as a Liquid Crystal Display (LCD), Light Emitting Diode (LED) display, plasma display, or a projected display to show news, advertisements, local announcements, and other multimedia content in public venues such as restaurants or shopping malls.

The deployment of digital signs enable advertisers to show advertising (ad) content that is more engaging and dynamic and to easily change the content in real time based on new promotions, time of day, even weather and other events. Currently there is no way to determine the effectiveness of the ad content. One of the main challenges in the digital signage industry has been providing digital signage operators with some clear return on investment (ROI) data. What is needed is a way for ad content to be targeted and adapted to the specific demographics of the people viewing it.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
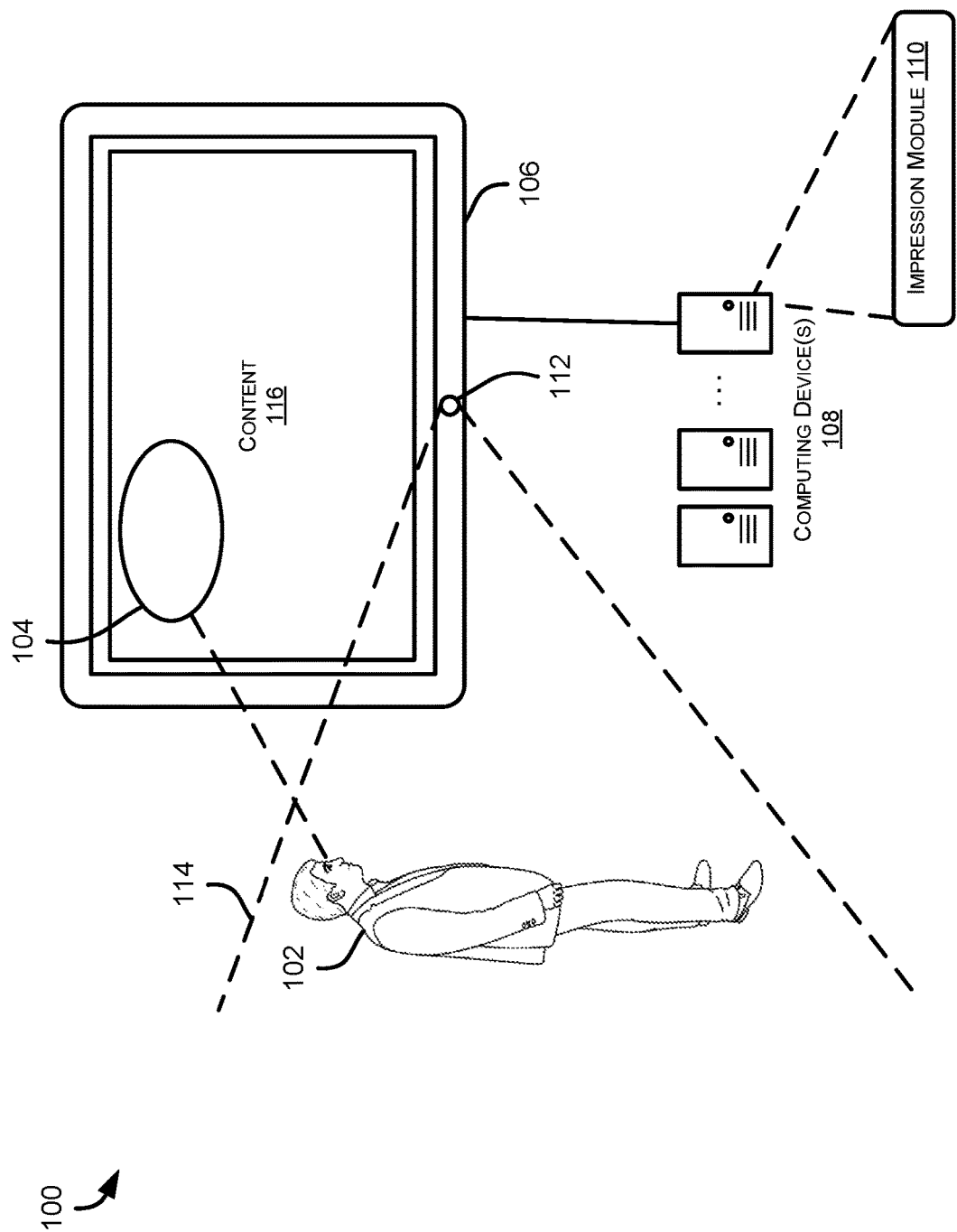
FIG. 1 illustrates an example of a system for generation of digital display impression data, according to at least one example.

Described herein are, among other things, techniques, devices, and systems, for determining engagement with digital signs and advertisements, and additionally for determining effectiveness of the digital signs and/or advertisements and revising and/or improving content for targeting additional engagement by customers. Initially, detecting eye contact with a digital sign and/or advertisement may be used to gather data on a digital advertisement display screen with a camera embedded in a housing thereof, or otherwise associated therewith. The eye contacts, which may be used to determine impression counts, such as instances of customers viewing or being drawn to advertisements and/or products associated with advertisements, can then be used to build a model for refining and identifying effective advertisements (e.g., advertisements that will drive customer engagement).

Digital sign and advertising impressions can provide quantitative viewership information and return on investment (ROI) data for advertisements and digital signs, for example within a facility. The impression data (e.g., data related to instances of viewers looking at and/or consuming content from a digital sign, including view counts, view time, time or area of interest within an advertisement, etc.) may be determined using sensors associated with a digital display and one or more machine learning models to identify eye contact and/or gaze direction for users visible to the sensors. For example, a camera built-in to a housing of a digital display may be used with one or more machine learning models (e.g., deep convolutional neural networks) trained to detect instances of eye contact from an egocentric view (e.g., from the perspective of the camera and/or display device).

For example, the one or more machine learning models may first detect a presence of a user, identify a head of the user and crop the head from the remaining video data, and subsequently make a binary decision regarding whether the person is looking at the camera (display device) or not. In some examples, the decision may further include where on the display device they are looking, and for how long, etc. to further identify areas or information of interest to the user. For impression data detection, video and/or image data including a human head is detected first and then a head crop is fed to the deep convolutional neural network which registers the impression data if the human is directly looking at the camera. For interaction detection (e.g., detection of events involving physical products), if the hand position of the shopper intersects with the product space region, then an interaction is registered.

In some examples, the display devices and systems described herein may provide impression data similar to data available to online advertisers, but previously unavailable for physical advertising signs. For instance, view counts of the advertisement, interactions or subsequent views of the product itself after viewing the advertisement, interactions with the product, conversion or purchase of the product, or purchase and/or interaction with alternative products may be examples of the types of information that the systems provided herein enable within a physical facility. Therefore, detecting human eye contact with display devices and detecting shopper's interaction with products on the shelves (representing click-throughs and conversions from the online retail environment) may be used to increase effectiveness and usefulness of digital signs, including advertisements or informational signs for users.

This can be achieved with one or more cameras embedded in the digital Ads screens. These cameras can be used for registering impressions on a digital advertisement display screens as well as detecting customer interaction with products on the shelves. Impression event can be defined as shopper looking at a display screen for more than a threshold amount of time. A click-through event can be defined as an interaction performed by a customer with a shelf (containing product for which advertisement was displayed) after an impression event was registered for the same shopper. This interaction detection with the shelf can be as sophisticated as determining fine-grained take/return events along with determining product taken/returned or can be as simple as detecting just hands entering/exiting the plane of the shelf/product-space.

In some examples, the impression data (e.g., data related to instances of viewers looking at and/or consuming content from a digital sign, including view counts, view time, time or area of interest within an advertisement, etc.) can be used to achieve targeted advertising within a physical space, which can be used to measure and improve the advertising ROI of a digital sign. Additionally, by correlating impression data with point-of-sale (POS) data, embodiments can also be used to establish a link between the response time to an advertisement by a certain demographic group and the effect on the sale of the advertised product.

In some examples, the impression data from displaying advertising on a digital display device may be used to anonymously gather information in a privacy-protecting manner for individuals while also enabling targeting of ads based on demographic or other data related to individuals. By equipping digital signs with a sensor, such as one or more front-facing cameras proximate the digital display device, and one or more computing devices associated therewith, digital signs and associated systems may anonymously detect the number of viewers, their gender, their age bracket, their distance from the advertising display screen, the amount of time they view the screen, a portion of the advertisement that they focus on, and other such data. In some examples, the systems described herein may adapt ad content based on the detected information. For example, if a viewer is a teenage girl, then an embodiment of the invention may change the content to highlight a back to school shoe promotion a few stores down from where the digital display screen is located. If the viewer is a senior male, then an embodiment may cause the digital display screen to display an advertisement about a golf club sale at a nearby sporting goods store.

In some examples, the systems and techniques herein may include determining dwell time or residence time, that is, how long viewers are watching the ads. These capabilities enable network operators, content providers, advertising agencies, and service providers to better deliver relevant messages and measure network and ad effectiveness with greater precision. By correlating sales data with the ad shown and the audiences' demographics, advertisers can target ads directly to their audience and measure their effectiveness. Additionally, for campaign planning and return-on-investment (ROI) measurement, impression data can be correlated with "proof-of-play" data, that is data relating to what, where, and when an ad was displayed on the digital sign, to determine content-specific viewership metrics by demographics and time of day.

In some examples, the impression data may also be correlated with interaction data, for example, identifying when users view an advertisement and then, within some threshold period of time, interact with an object (such as on a shelf of a store). In some examples, the users may pick up items, look at them, may return them, and may interact with other products or substitute products. Such information may be identified using facilities equipped with sensors to detect such events, including cashier-less retail locations that rely on various sensors to detect and determine items selected by users. In this manner, additional data may be provided on effectiveness of advertising including whether users pick up the same items as advertised or alternatives, and what they ultimately choose to purchase. Such information may be used to identify particularly effective or relevant ads, and to help product owners and retailers to provide relevant information and advertising to aid users in decision-making.

In some examples, the advertising systems described herein may enable targeted advertising in which future viewers or customers belonging to the same or similar demographic as previous viewers are targeted based on the viewing behavior or patterns of the previous viewers. By analyzing the impression data collected from previous viewers positioned in front of a digital display, embodiments can discover viewing patterns and use this information to train advertising models that can be deployed to the digital sign. These advertising models can then be used to choose specific advertisements from the inventory of available advertising content to intelligently target future viewers.

In some examples, the impression data may be used to predict an effectiveness of an advertisement or other such content by analyzing affective features of the multimedia (audio, visual, text etc.) of digital content displayed on the display device. More specifically, in some examples, systems and techniques described herein may analyze the characteristics of the multimedia content that are correlated with higher effectiveness (e.g., higher normalized impressions). With a model to predict the effectiveness of a digital advertisement and/or other such content, the advertisements may be refined and played on the display device to maximize engagement of customers with digital advertisements as well as to provide feedback to content creators about what type of content attracts more attention from customers.

In some examples, the effectiveness of the content may be measured in terms of "stickiness" to capture the relative impression for a segment within digital content to impressions across the content or across a selection of digital content. Formally, the stickiness of a segment within an overall content file may be the ratio of number of impressions for a given segment to the ratio of number of impressions for all segments in the content file, averaged over all instances of displays of the content. Therefore, the stickiness for a five second segment of an advertisement may be determined by identifying a number of impressions during the five second segment compared against a total number of impressions for the entire advertisement and may be divided by a number of times that the advertisement was displayed during the observation window.

In some examples, the stickiness may be compared across different content files, not just within a single content file. For example, to compare stickiness and/or effectiveness of a particular advertisement or advertising style against other styles. Such metrics may be useful to content creators to understand if certain forms of content gain impressions, regardless of the advertised product.

In an illustrative example where a digital display is used to present advertisements within a retail store, stickiness can be attributed to the number of impressions the advertisement attracts as well as to the conversion rate (e.g., purchases) it drives. These advertisements with a higher conversion rate or higher stickiness rating may have peculiar affective audio-visual features such as variety of color/objects, number of scenes/movement, displayed emotions etc. and audio features related to liveliness of speech/music etc. which drive more customer attention. These features may differ for category of products being advertised, different demographics where these advertisement are shown, different locations in the store where it's shown, and other such factors.

In the illustrative example, a large volume of impression data may be generated for the advertisements and different styles, or versions of the advertisements may be presented, such as videos with audio, videos without audio, static images, and other such types of advertising. The impression data may be used to identify portions of the advertisement that received impressions. For example, with an advertisement that lasts sixty seconds displayed in a variety of stores, the impression data provides statistics related to time windows with impressions that may be as granular as one second. This impression data can be used to identify portions of the sixty second advertisement received maximum impressions and in subsequent advertising campaigns or showings of the advertisement, only those parts of the advertisement may be displayed to maximize the impression counts.

In some examples, a machine learning model may be trained using ground truth impression data and associated content to predict the potential of a given advertisement even before being presented to the audience. Such a model may predict the stickiness or value of a given multi-media advertisement. In some examples, the model, or other algorithms, may also identify portions of the advertisement that have a relatively higher or lower stickiness and therefore may suggest alterations to the advertisement to increase the stickiness of those portions. For example, by identifying a portion of an advertisement that may underperform, the content creator may adjust that portion to increase the overall impact of the advertisement without having to release the advertisement, resulting in higher quality advertisements and more effective use of advertising dollars and time.

The model for identifying the portions of the advertisement that may have a higher, or above a threshold, level of stickiness may use a multimodal encoder, embeddings, and a classifier. In the model, the classifier may be trained using impression counts for advertisement segments observed using the systems described herein. The classifier may, in some examples, be specific to product categories, store geographic regions, demographic divisions, and other such distinctions. Such categories may provide a clearer separation between embeddings for sticky and non-sticky content identified by the model. The model may be trained using the ground truth data to generate the embeddings for identifying stickiness of content.

After the model is trained, the model may be used to evaluate multimedia content input to the model. For instance, video, audio, and/or text inputs may be provided to the model that will be encoded by the multimodal encoder. The multimodal encoder may be used to generate the embeddings for the provided content. The embeddings produced by the encoder may then be classified by the classifier to determine whether the segments of the content are identified as having a predicted stickiness above or below a threshold level. The classifier may perform inference using one or more machine learning models to identify results as having stickiness above or below a threshold level, with the classifier trained using the observed impression data described herein.

In some examples, the content may also be tagged or annotated with labels that describe the segments or portions of the content based on the characteristics. For example, the tags may identify a type of music, identify particular objects, an overall emotion, a style, or other such metadata that may be user-curated to provide feedback to content curators with specific guidance on how and why particular content is identified as effective or "sticky" while other content is not. Such tags may be generated by human annotations and/or using one or more models to identify such characteristics and automatically generate the tags based on the identified characteristics, such as objects included within the advertisements.

In some examples, generative models for content may be produced that will output content identified with stickiness above a threshold value given a particular input, such as an input description and/or text prompt. The content can be described by the model, for example to describe visual attributes of the content, audio attributes, etc. In some examples, the content may be automatically generated by providing the identified product and/or prompt information to the model. The content can be described as a visual attributes (logos, scenes, characters, colors etc.) as well as audio attributes (background music, song, instrument etc.) which tends to attract more attention from viewers.

Having now discussed examples of the systems and methods described herein, FIG. 1 illustrates an example of a system 100 for generation of digital display impression data for use in refining and generating improved digital content. In the example of FIG. 1, the system 100 includes a display device 106 for displaying content 116 to a user 102. The system 100 also includes computing device(s) 108 that may be used to perform one or more computations and/or determinations, as described herein.

The display device 106 may include a digital display sign, for example for digital advertising or providing information to viewers. In some examples, the display device 106 may include a digital advertising sign positioned within a facility, such as a retail store that provides information and/or advertisements for particular products to customers. The display device 106 includes a camera 112 within the housing of the display device. In some examples, the camera 112 may be positioned outside of the display device 106 but may be associated with and/or in proximity to the display device 106.

The camera 112 may include one or more different types of sensors, such as a visible light camera, infrared camera, thermal camera, depth camera, or other such sensor capable of detecting the presence of an individual in proximity to the display device 106 and also capable of providing data to the computing device(s) 108 that may be used to determine the gaze direction of the individual and/or whether the individual is looking in a direction towards the display device 106 and/or camera 112.

The camera 112 has a field of view 114 that may include or capture a portion of an environment including regions where customers may stand or be positioned as they view. The user 102, when within the field of view 114, may be detected by the camera 112. The camera 112 may capture image data including the user 102 and, using the computing device(s) 108, may determine whether the user 102 is looking at the display device 106.

Figure 3:
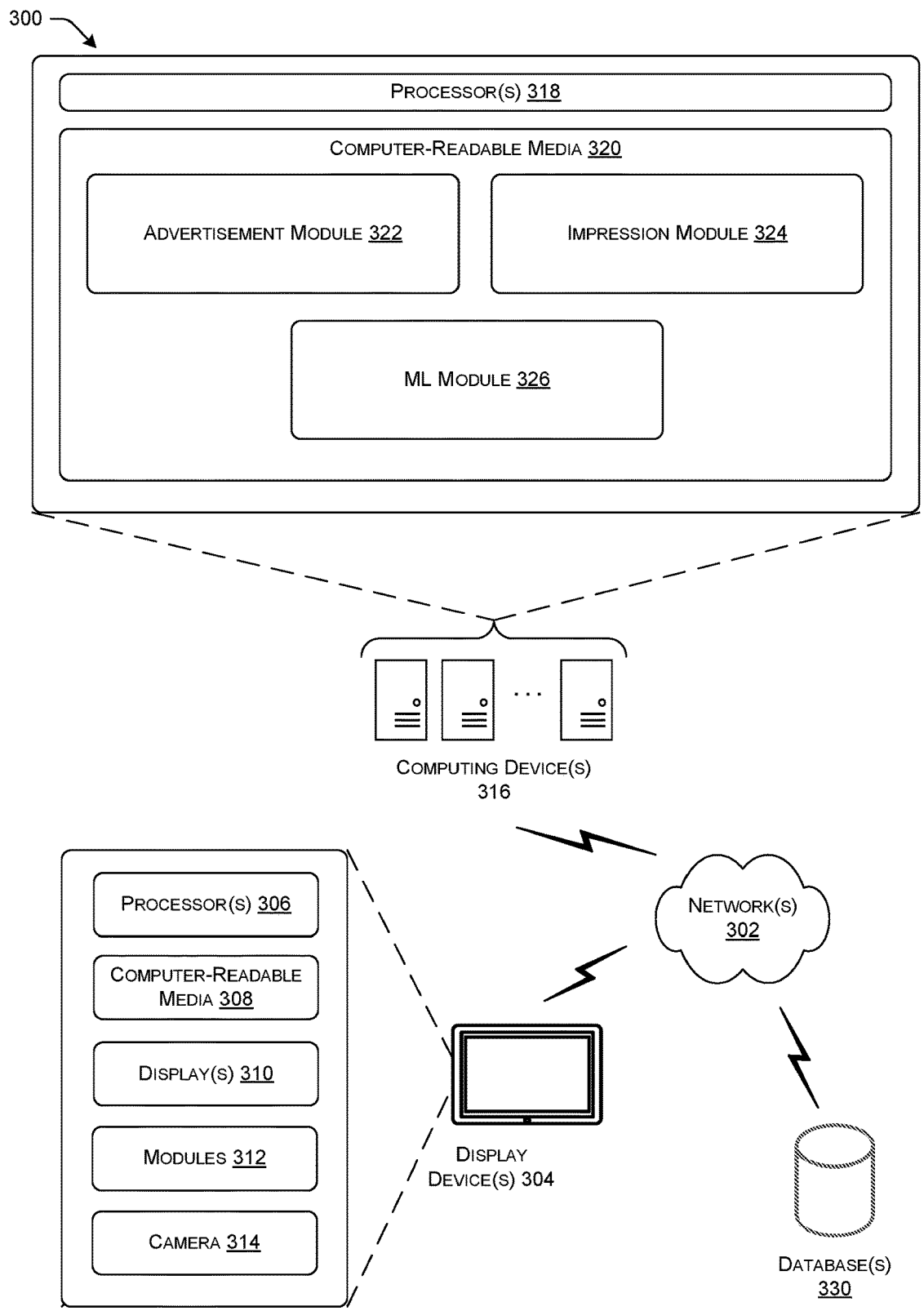
FIG. 3 illustrates an example system architecture for processes described herein, according to at least one example.
Figure 7:
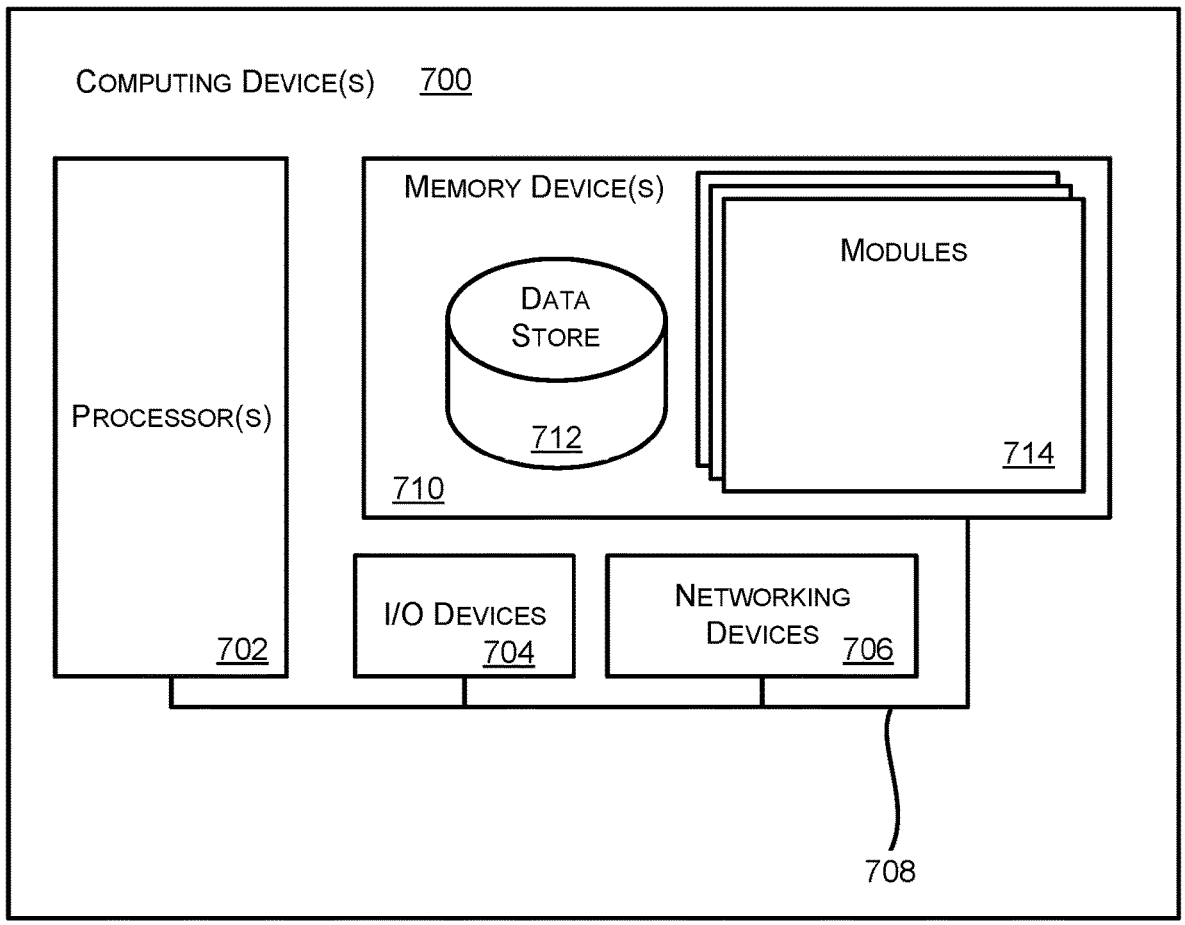
FIG. 7 illustrates a block diagram of a computing system for use with the systems and methods described herein, according to the present description.

The computing device(s) 108, which may include components such as shown and described with respect to FIGS. 3 and 7 and includes an impression module 110 that may be used to determine when the user 102 is viewing the content 116. The impression module 110 may provide quantitative viewership information and ROI data for content 116.

The impression module 110 may include, in some examples, one or more machine learning models to detect a presence of a user, identify a pose for the user 102, and subsequently, based on the pose, make a binary decision regarding whether the person is looking at the camera 112 (display device 106) or not. In some examples, the decision may further include where on the display device 106 they are looking, and for how long, etc. to further identify areas or information of interest to the user. For impression data detection, video and/or image data from the camera 112 may be fed to a deep convolutional neural network which registers the impression data if the user is directly looking at the camera 112 and/or at the display device 106 (e.g., based on calibration identifying a distance or difference between the location of the camera 112 and the location of the display device 106.

For example, the user 102 may be identified within the field of view of the camera 112 using a person detection algorithm that may be embodied within the impression module 110, or other components of the system. The user 102 may then be evaluated, by the impression module 110, to determine whether the user 102 is looking at the display device 106 or some other location. In the event that the impression module 110 determines that the user 102 is looking at the display device 106, the area of interest 104 for the user 102 may be identified. The area of interest 104 is illustrated as a portion of the content 116, though in some examples, the area of interest 104 may relate to a segment of video content. In some examples, the area of interest 104 may identify one or both of a portion of content 116 on the display device 106 that is viewed by the user, as well as a time period over which the user 102 views the portion of the content 116.

In some examples, the camera 112 may be used for identifying events, such as interactions with items on shelves of a facility. For these interaction detection (e.g., detection of events involving physical products), if the hand position of the shopper intersects with the product space region, then an interaction is registered. The events can be defined as an interaction performed by a shopper with the shelf (containing product for which Ad was displayed) after an impression event was registered for the same shopper. This interaction detection with the shelf can be as sophisticated as determining fine-grained take/return events along with determining product taken/returned or can be as simple as detecting just hands entering/exiting the plane of the shelf/product-space. In some examples, other sensors, such as weight sensors, additional cameras, and the like, may be used to determine the interactions with items on the shelves.

In some examples, the impression module 110 may use impression data to achieve targeted advertising within a physical space, which can be used to measure and improve the advertising ROI of a digital sign. Additionally, by correlating impression data with point-of-sale (POS) data, embodiments can also be used to establish a link between the response time to an advertisement by a certain demographic group and the effect on the sale of the advertised product.

In some examples, the impression module 110 may anonymously gather information in a privacy-protecting manner for individuals. For instance, the impression module 110 and the data for determining impressions may remain on-board the display device 106 and may be communicated, in an anonymized manner, to the computing device 108 for analysis of the impression data. In some examples, by equipping digital display 106 with a sensor, such as one or more front-facing cameras proximate the digital display 106, and one or more computing devices associated therewith, digital signs and associated systems may anonymously detect the number of viewers, their gender, their age bracket, their distance from the advertising display screen, the amount of time they view the screen, a portion of the advertisement that they focus on, and other such data. In some examples, the systems described herein may adapt ad content based on the detected information.

In some examples, the systems and techniques herein may include determining dwell time or residence time, that is, how long viewers are watching the content 116. These capabilities enable network operators, content providers, advertising agencies, and service providers to better deliver relevant messages and measure network and ad effectiveness with greater precision. By correlating sales data with the ad shown and the audiences' demographics, advertisers can target ads directly to their audience and measure their effectiveness. Additionally, for campaign planning and return-on-investment (ROI) measurement, impression data can be correlated with "proof-of-play" data, that is data relating to what, where, and when an ad was displayed on the digital sign, to determine content-specific viewership metrics by demographics and time of day.

In some examples, the impression module 110 may be used to determine an impression score, referred to herein as "stickiness" that may relate to the effectiveness of the content 116 in drawing and/or engaging attention of the user 102. The stickiness may be used to evaluate content 116 as well as to predict an effectiveness of un-displayed content and thereby improve the content prior to releasing for display at the display device 106.

In some examples, the impression data gathered by the impression module 110 may be used to predict an effectiveness of an advertisement or other such content by analyzing affective features of the multimedia (audio, visual, text etc.) of content 116 displayed on the display device 106. More specifically, in some examples, the impression module 110 may analyze the characteristics of the content 116 that are correlated with higher effectiveness (e.g., higher normalized impressions). With a model to predict the effectiveness of content 116, the content 116 may be refined and played on the display device 106 to maximize engagement of customers with content as well as to provide feedback to content creators about what type of content attracts more attention from customers.

In some examples, the effectiveness of the content 116 may be measured in terms of "stickiness" to capture the relative impression for a segment within content 116 to impressions across the content or across a selection of content 116. The stickiness of a segment within an overall content 116 may be the ratio of number of impressions for a given segment to the ratio of number of impressions for all segments in the content 116, averaged over all instances of displays of the content 116. Therefore, the stickiness for a five second segment of an advertisement may be determined by identifying a number of impressions during the five second segment compared against a total number of impressions for the entire advertisement and may be divided by a number of times that the advertisement was displayed during the observation window.

In some examples, the stickiness may be compared across different content 116, not just within a single content file. For example, to compare stickiness and/or effectiveness of a particular advertisement or advertising style against other styles. Such metrics may be useful to content creators to understand if certain forms of content gain impressions, regardless of the advertised product.

In an illustrative example where the digital display 106 is used to present advertisements within a retail store, stickiness can be attributed to the number of impressions the advertisement attracts as well as to the conversion rate (e.g., purchases) it drives. The advertisements with a higher conversion rate or higher stickiness rating may have peculiar affective audio-visual features such as variety of color/objects, number of scenes/movement, displayed emotions etc. and audio features related to liveliness of speech/music etc. which drive more customer attention. These features may differ for category of products being advertised, different demographics where these advertisement are shown, different locations in the store where it's shown, and other such factors.

In some examples, impression data may be generated for content 116 and different styles or versions of the content 116 may be presented, such as videos with audio, videos without audio, static images, and other such types of advertising. The impression data may be used to identify portions of the advertisement that received impressions. For example, with an advertisement that lasts sixty seconds displayed in a variety of stores, the impression data provides statistics related to time windows with impressions that may be as granular as one second. This impression data can be used to identify portions of the sixty second advertisement received maximum impressions and in subsequent advertising campaigns or showings of the advertisement, only those parts of the advertisement may be displayed to maximize the impression counts.

In some examples, the impression module 110 may include a machine learning model that may be trained using ground truth impression data and associated content to predict the potential of given content even before being presented to the audience. In some examples, the impression module 110, or other algorithms, may also identify portions of the content 116 that have a relatively higher or lower stickiness and therefore may suggest alterations to the content 116 to increase the stickiness of those portions. For example, by identifying a portion of an advertisement that may underperform, the content creator may adjust that portion to increase the overall impact of the advertisement without having to release the advertisement, resulting in higher quality advertisements and more effective use of advertising dollars and time.

The impression module 110 may be implemented for identifying the portions of the content 116 that may have a higher, or above a threshold, level of stickiness may use a multimodal encoder, embeddings, and a classifier. In the impression module 110, the classifier may be trained using impression counts for segments of the content 116 observed using the systems described herein. The classifier may, in some examples, be specific to product categories, store geographic regions, demographic divisions, and other such distinctions. Such categories may provide a clearer separation between embeddings for sticky and non-sticky content identified by the impression module 110. The impression module 110 may be trained using the ground truth data to generate the embeddings for identifying stickiness of content.

After the impression module 110 is trained, it may be used to evaluate multimedia content input to the model. For instance, video, audio, and/or text inputs may be provided to the model that will be encoded by the multimodal encoder. The multimodal encoder may be used to generate the embeddings for the provided content. The embeddings produced by the encoder may then be classified by the classifier to determine whether the segments of the content 116 are identified as having a predicted stickiness above or below a threshold level. The classifier may perform inference using one or more machine learning models to identify results as having stickiness above or below a threshold level, with the classifier trained using the observed impression data described herein.

In some examples, the impression module 110 may also tag content 116 with labels that describe the segments or portions of the content 116 based on the characteristics. In some examples, the tags may be human-generated and input into the impression module 110. For example, the tags may identify a type of music, identify particular objects, an overall emotion, a style, or other such metadata that may be user-curated to provide feedback to content curators with specific guidance on how and why particular content is identified as effective or "sticky" while other content is not. Such tags may be generated by human annotations and/or using one or more models to identify such characteristics and automatically generate the tags based on the identified characteristics, such as objects included within the advertisements.

In some examples, the impression module 110 may be used as a generative model for content 116 that will output content identified with stickiness above a threshold value given a particular input, such as an input description and/or text prompt. The content 116 can be described by the model, for example to describe visual attributes of the content, audio attributes, etc. In some examples, the content 116 may be automatically generated by providing the identified product and/or prompt information to the model. The content 116 can be described as a visual attributes (logos, scenes, characters, colors etc.) as well as audio attributes (background music, song, instrument etc.) which tends to attract more attention from viewers.

In some examples, the impression data from the impression module 110 may also be correlated with interaction data, for example, identifying when users view an advertisement and then, within some threshold period of time, interact with an object (such as on a shelf of a store). In some examples, the users may pick up items, look at them, may return them, and may interact with other products or substitute products. Such information may be identified using facilities equipped with sensors to detect such events, including cashier-less retail locations that rely on various sensors to detect and determine items selected by users. In this manner, additional data may be provided on effectiveness of advertising including whether users pick up the same items as advertised or alternatives, and what they ultimately choose to purchase. Such information may be used to identify particularly effective or relevant ads, and to help product owners and retailers to provide relevant information and advertising to aid users in decision-making.

In some examples, the advertising systems described herein may enable targeted advertising in which future viewers or customers belonging to the same or similar demographic as previous viewers are targeted based on the viewing behavior or patterns of the previous viewers. By analyzing the impression data collected from previous viewers positioned in front of a digital display, embodiments can discover viewing patterns and use this information to train advertising models that can be deployed to the digital sign. These advertising models can then be used to choose specific advertisements from the inventory of available advertising content to intelligently target future viewers.

Figure 2:
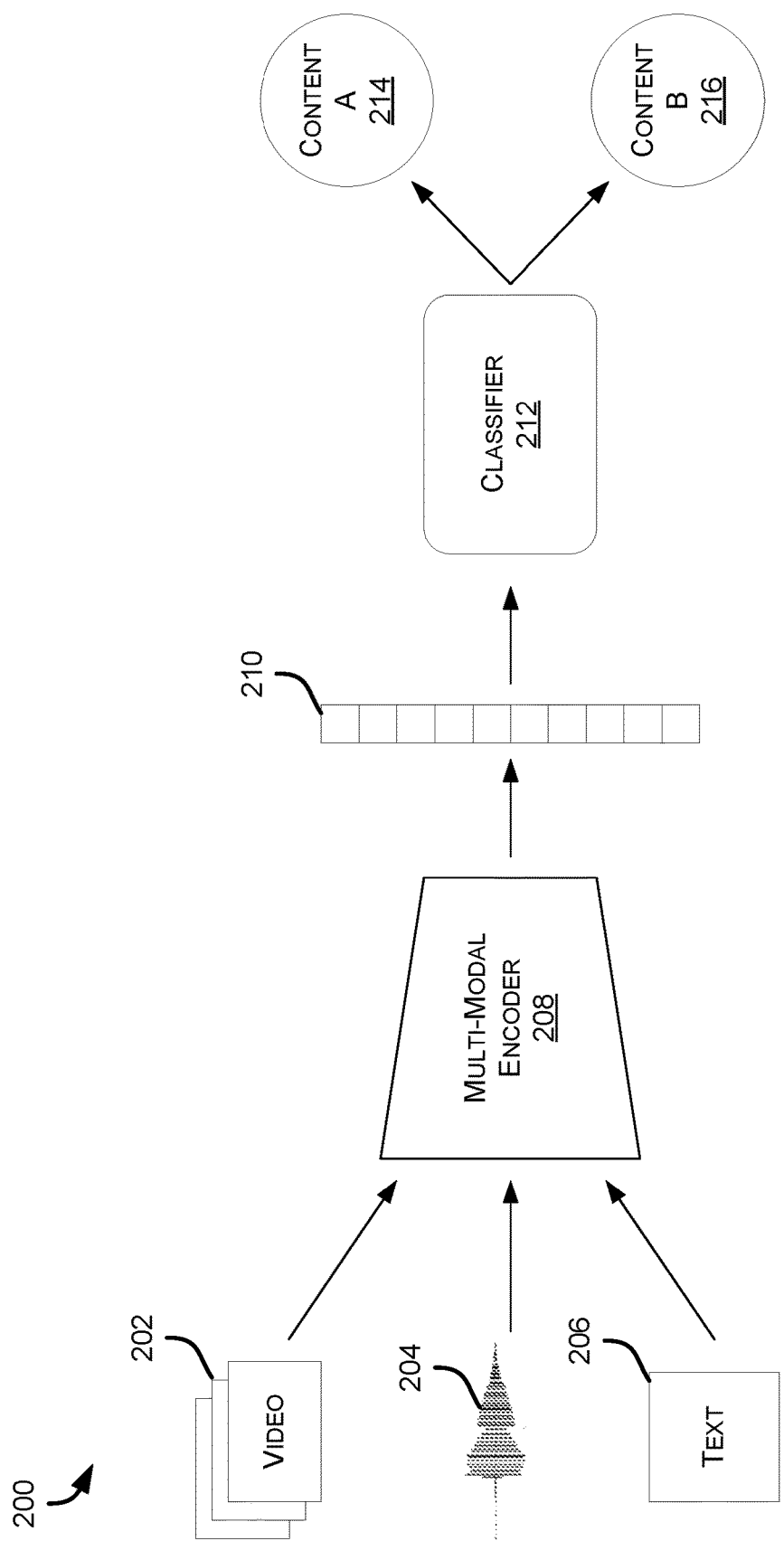
FIG. 2 illustrates an example system for processing content to identify content based on impression data, according to at least one example.

FIG. 2 illustrates an example system for processing content to identify content based on impression data, according to at least one example. The system 200 may represent a model that may implement one or more machine learning algorithms and/or other techniques or algorithms to predict and/or determine impression data for content. The system 200 may be trained using ground truth impression data and associated content to predict the potential of a given advertisement as gathered by the display device 106. The system 200 may be used to predict the stickiness or value of given multi-media content. In some examples, the system 200 may differentiate between content A 214 that has a relatively higher stickiness compared against content b 216 that has a lower stickiness. The difference between the content A 214 and content B 216 may be based on the threshold level of stickiness defined for the system 200. The system 200 may then be used to identify content B 216 that may be altered to increase the stickiness or other effectiveness measures for the content. For example, by identifying content B 216, the content creator may adjust characteristics of the content B 216 to increase the overall impact of the advertisement without having to release the advertisement, resulting in higher quality advertisements and more effective use of advertising dollars and time. In some examples, the system 200 may not separate the content into two categories but may score individual segments and may rank into a scale that may be continuous and/or discrete for evaluating relative stickiness of segments and identifying underperforming portions of the content.

The system 200 may use a multimodal encoder 208, embeddings 210, and a classifier 212 to identify the content A 214 and content B 216. The system 200 receives multimodal inputs, such as video 202, audio 204, and text 206. The multimodal inputs may be input into the multi-modal encoder 208 to generate embeddings 210. In some examples, the multi-modal encoder 208 may use different encoders based on inputs provided to the system 200. A first encoder for producing the embeddings 210 may include an image encoder. The image encoder may, for example include the CLIP image encoder model from OpenAI with a ResNet-50 model. In some examples, multiple models may be combined through multi-head attention. A second encoder for producing the media retrieval embedding 306 may include a second image encoder, such as just the CLIP image encoder. A third encoder for producing the embedding 210 may include an encoder for processing text, such as a CLIP text encoder from OpenAI.

The multi-modal encoder 208 may be used to produce the embeddings 210. In the event that the user input is a single image, such as the video 202, then the encoder may be used on representative frames from the video 202 and the encoder may also be used on the image input. In another example, if text 206 is provided alone, then the encoder may be used for determining embeddings 210. The embeddings may be merged to form a new embedding that represents the multimodal inputs.

Though described with respect to an image encoder, the system 200 may receive video inputs additionally. Video inputs may be processed by a video encoder in some examples. In some examples, the video inputs may be segmented and have representative frames extracted as described herein that may be processed by image encoders.

The encoder may produce embeddings for the different inputs that may be aggregated into a single embedding for feeding to the classifier 212. The multiple embeddings may be combined using different aggregation techniques such as mean pooling, a transformer encoder, and/or a transformer encoder with a long short-term memory (LSTM) neural network. The aggregation may be used to aggregate frame embeddings into a video embedding for the video input for example, or to combine embeddings for multiple different text inputs.

The classifier 212 may be used to classify and/or determine the stickiness, or other such metrics for the inputs. The classifier 212 may classify the segments or portions of the inputs by using one or more machine learning models. The classifier 212 may perform inference using one or more machine learning models to identify content A 214 and content B 216. The system 200 may act on segments of video data, for example by dividing the video 202 into clips having a length of one second or less. The classifier may include a model trained using ground truth data gathered as described with respect to the display device 106.

In the system 200, the classifier 212 may be trained using impression counts for advertisement segments observed using the systems described herein. The classifier 212 may, in some examples, be specific to product categories, store geographic regions, demographic divisions, and other such distinctions. Such categories may provide a clearer separation between embeddings for sticky (e.g., content A 214) and non-sticky content (e.g., content B 216) identified by the system 200.

In some examples, the content may also be tagged or annotated with labels that describe the segments or portions of the content based on the characteristics. For example, the tags may identify a type of music, identify particular objects, an overall emotion, a style, or other such metadata that may be user-curated to provide feedback to content curators with specific guidance on how and why particular content is identified as effective or "sticky" while other content is not. Such tags may be generated by human annotations and/or using one or more models to identify such characteristics and automatically generate the tags based on the identified characteristics, such as objects included within the advertisements.

In some examples, generative models for content may be produced that will output content identified with stickiness above a threshold value given a particular input, such as an input description and/or text prompt. The content can be described by the model, for example to describe visual attributes of the content, audio attributes, etc. In some examples, the content may be automatically generated by providing the identified product and/or prompt information to the model. The content can be described as a visual attributes (logos, scenes, characters, colors etc.) as well as audio attributes (background music, song, instrument etc.) which tends to attract more attention from viewers.

FIG. 3 illustrates a system 300 for processes described herein, according to at least one example. Though FIG. 3 is shown having particular modules and elements, other modules, components, or elements may be used to accomplish the techniques associated therewith. The elements of the system 300 illustrate an example environment for performing various techniques related to determining advertising impressions of display devices 304 in physical environments.

As shown in FIG. 3, the system 300 may include one or more display devices 304, one or more network(s) 302, a database 330 having various advertisement, interaction, event, and impression data, and one or more computing devices 316. In various embodiments, the display devices 304 may include one or more processor(s) 306, computer-readable media 308, a display 310, modules 312 that may be similar and/or identical to the impression module 110, and a camera 314. The computing devices 316 may also include one or more processor(s) 318 and computer-readable media 320, which may include an advertisement module 322, an impression module 324, and a machine learning (ML) module 326.

In various embodiments, the computing devices 316 may be implemented within the display device 304, such as with a built-in computing device. In some examples, the computing devices 316 may be remote from the display device 304 and may receive data from the display device 304 and also convey advertisement and other information to the display device 304.

The processor(s) 306 of the display device 304 may execute one or more modules and/or processes to cause the display device 304 to perform a variety of functions, as set forth herein. In some embodiments, the processor(s) 306 may include a central processing unit (CPU), a graphics processing unit (GPU), both CPU and GPU, or other processing units or components known in the art. Additionally, each of the processor(s) 306 may possess its own local memory, which also may store program modules, program data, and/or one or more operating systems.

In at least one configuration, the computer-readable media 308 of the user device 304 may include any components that may be used to view, receive, access, input, or otherwise interact with text, audio, image, and/or video data, including data provided by the computing devices 316 and/or from the database 330. Depending on the exact configuration and type of the display device 304, the computer-readable media 308 may also include volatile memory (such as RAM), non-volatile memory (such as ROM, flash memory, miniature hard drive, memory card, or the like), or some combination thereof. In some examples, the display device 304 may include modules similar or identical to the impression module 110 and/or the advertisement module 322, the impression module 324, and the ML module 326. The display device 304 may use the modules to perform the methods described herein without the need to access the computing devices 316.

In various embodiments, the display device 304 may also have input device(s) such as a keyboard, a mouse, a pen, a voice input device, a touch input device, etc. The display device 304 may also include the display 310 and other output device(s), such as speakers, a printer, etc. A user may utilize the foregoing features to interact with the display device 304 and/or the computing devices 316 via the network(s) 302. More particularly, the display 310 of the display device 304 may include any type of display 310 known in the art that is configured to present (e.g., display) information to users.

In some embodiments, the network(s) 302 may be any type of network known in the art, such as the Internet. Moreover, the display device 304, database 330, and the computing devices 316 may communicatively couple to the network(s) 302 in any manner, such as by a wired or wireless connection. The network(s) 302 may also facilitate communication between the display device 304, database 330, and the computing devices 316.

In addition, and as mentioned previously, the computing devices 316 may include the one or more processor(s) 318 and the computer-readable media 320. The computing devices 316 may also include additional components not listed above that may perform any function associated with the computing devices 316. In various embodiments, the computing devices 316 may be any type of server, such as a network-accessible server, and may be one of multiple servers included in a server cluster or server farm. In other embodiments, the processor(s) 318 and the computer-readable media 320 of the computing devices 316 may be the same as, similar to, or different from the processor(s) 306 and the computer-readable media 308, respectively, of the user device 304.

The advertisement module 322 may deliver advertisement content to the display device 304, for example including still and/or video advertisements that may rotate and/or cycle through a variety of products and/or different advertisements. Additionally, the advertisement module 322 may determine an advertisement to be provided for display based on demographic information and/or tracking information for a customer within a store. For example, based on a current shopping history for a customer, as tracked according to FIGS. 7-8, the advertisement module 322 may determine targeted advertisements to present to individuals within a line of sight of the display device 304.

The impression module 324 may include and/or perform similar tasks as described with respect to impression module 110 and system 200. The impression module 324 may include, in some examples, one or more machine learning models to detect a presence of a user, identify pose of the user, and subsequently make a binary decision regarding whether the person is looking at the camera 314 (display device 304) or not. In some examples, the decision may further include where on the display device 304 they are looking, and for how long, etc. to further identify areas or information of interest to the user. For impression data detection, video and/or image data from the camera 314 may be fed to a deep convolutional neural network which registers the impression data if the user is directly looking at the camera 314 and/or at the display device 304 (e.g., based on calibration identifying a distance or difference between the location of the camera 314 and the location of the display device 304.

In some examples, the impression module 324 may use impression data to achieve targeted advertising within a physical space, which can be used to measure and improve the advertising ROI of a digital sign. Additionally, by correlating impression data with point-of-sale (POS) data, embodiments can also be used to establish a link between the response time to an advertisement by a certain demographic group and the effect on the sale of the advertised product.

In some examples, the impression module 324 may anonymously gather information in a privacy-protecting manner for individuals. For instance, the impression module 324 and the data for determining impressions may remain on-board the display device 304 and may be communicated, in an anonymized manner, to a computing device for analysis of the impression data. In some examples, by equipping display device 304 with the camera 314 to anonymously detect the number of viewers, their gender, their age bracket, their distance from the advertising display screen, the amount of time they view the screen, a portion of the advertisement that they focus on, and other such data. In some examples, the systems described herein may adapt ad content based on the detected information.

In some examples, the impression module 324 may determine dwell time or residence time, that is, how long viewers are watching the advertisement content. These capabilities enable network operators, content providers, advertising agencies, and service providers to better deliver relevant messages and measure network and ad effectiveness with greater precision. By correlating sales data with the ad shown and the audiences' demographics, advertisers can target ads directly to their audience and measure their effectiveness. Additionally, for campaign planning and return-on-investment (ROI) measurement, impression data can be correlated with "proof-of-play" data, that is data relating to what, where, and when an ad was displayed on the digital sign, to determine content-specific viewership metrics by demographics and time of day.

In some examples, the impression data from the impression module 324 may also be correlated with interaction data. The interaction data may include interactions of customers with items. In some examples, the users may pick up items, look at them, may return them, and may interact with other products or substitute products. Such information may be identified using facilities equipped with sensors to detect such events, including cashier-less retail locations that rely on various sensors to detect and determine items selected by users. In this manner, additional data may be provided on effectiveness of advertising including whether users pick up the same items as advertised or alternatives, and what they ultimately choose to purchase. Such information may be used to identify particularly effective or relevant ads, and to help product owners and retailers to provide relevant information and advertising to aid users in decision-making.

In some examples, the camera 314 may be used for identifying events, such as interactions with items on shelves of a facility. For these interaction detection (e.g., detection of events involving physical products), if the hand position of the shopper intersects with the product space region, then an interaction is registered. The events can be defined as an interaction performed by a shopper with the shelf (containing product for which advertisement was displayed) after an impression event was registered for the same shopper. This interaction detection with the shelf can be as sophisticated as determining fine-grained take/return events along with determining product taken/returned or can be as simple as detecting just hands entering/exiting the plane of the shelf/product-space.

The machine learning (ML) module 328 may include one or more machine learning models that may perform one or more tasks as described herein, including character identification, object identification, face recognition, segmentation, image characteristic, feature recognition, and image characteristic adjustment. For example, several suitable algorithms are available on the market, including the FaceVACS® software by Cognitec Systems GmbH, FaceSDK offered by Luxand, Inc., Rekognition® by Amazon, Inc., CLIP by OpenAI, and FaceRecognizer by OpenCV. In some examples, the models may include machine learning models such as ResNet, EfficientNet, and FaceNet in combination with one or more other models or as standalone models.

Machine learning may be performed using a wide variety of methods of combinations of methods, such as contrastive learning, supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that may be used in the present technology.

In some examples, the ML module 328 may include access to or versions of multiple different machine learning models that may be implemented and/or trained according to the techniques described herein. Any suitable machine learning algorithm may be implemented by the ML module 328. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Figure 4:
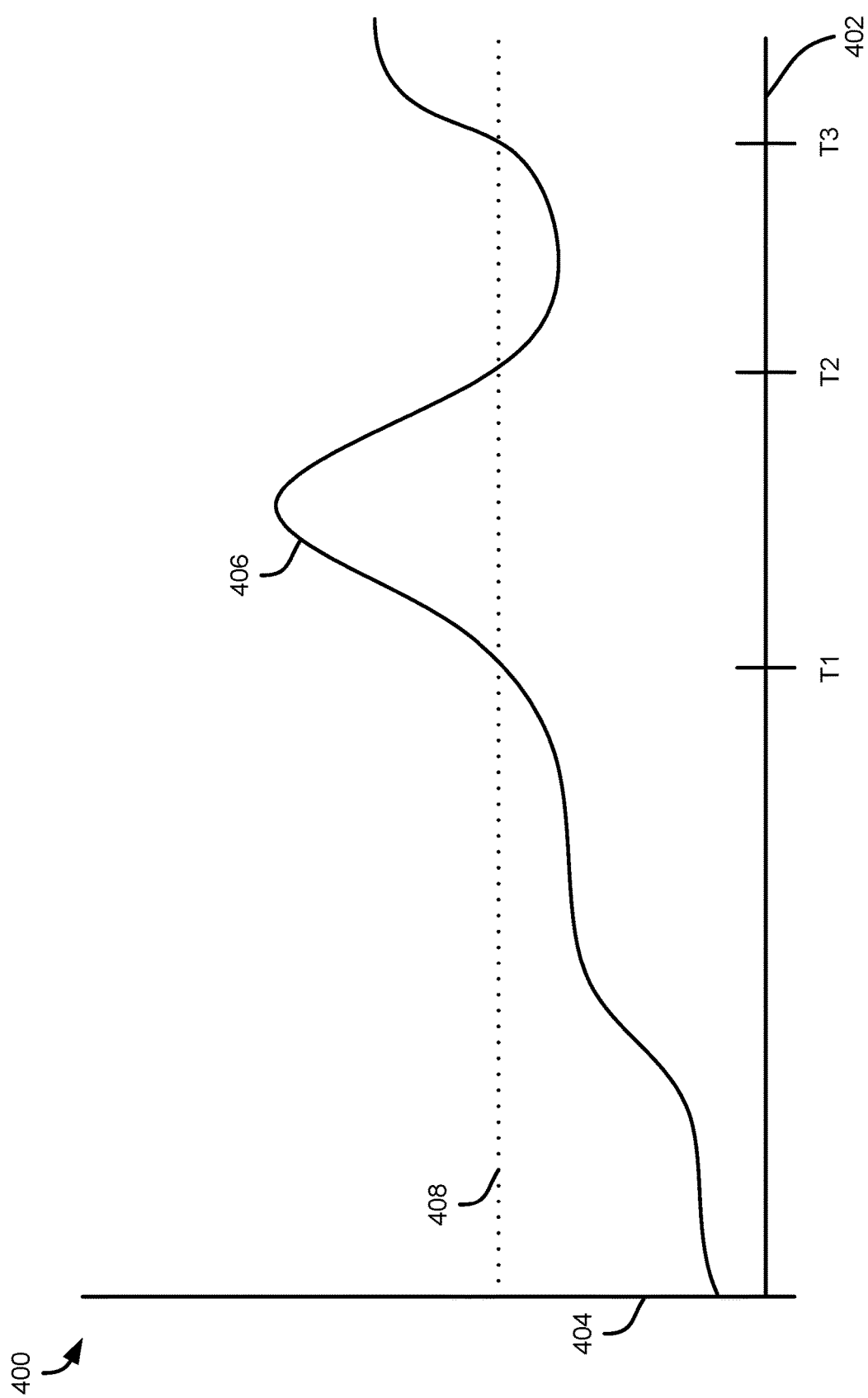
FIG. 4 illustrates an example representation of impression data for content and identified portions of the content based on the impression data, according to at least one example.

FIG. 4 illustrates an example representation of impression data 400 for content as a function of time and identified portions of the content 402 based on the impression data, according to at least one example. The impression data 400 includes a representation of impressions 404 over time as a function of time 402 over the length of the content. The impression count 406 over time illustrate the times, over the course of the content, that customers view the content. The impression data 400 also includes a threshold 408 for the impression count 406 over time. The impression count 406 over time 402 is shown as above the threshold 408 between T1 and T2 before dropping below the threshold 408 and returning above the threshold 408 at T3. The intervals when the impression count 406 is above the threshold 408 may be identified with timestamps indicative of a start and end time for when the impression count 406 is effective with respect to customers viewing the display device.

The impression count 406 may illustrate portions of the content associated with impression counts, impression rates, stickiness, or other such metrics that meet or exceed the threshold 408. The portions of the content between T1 and T2 and from T3 to the end of the content may be identified as particularly effective. The other portions of the content may be identified as underperforming with respect to impressions on customers and may be revised to improve the effectiveness of the content as described with respect to FIG. 6. The impression count 406 may be output by the impression module 110 and/or the system 200 as described herein and may be generated using one or more machine learning models as discussed herein. In some examples, the impression count 406 may be determined based on heuristics, such as to calculate stickiness as described herein for segments of the content 402 and then identify the impression count based on the stickiness determinations.

Figure 5:
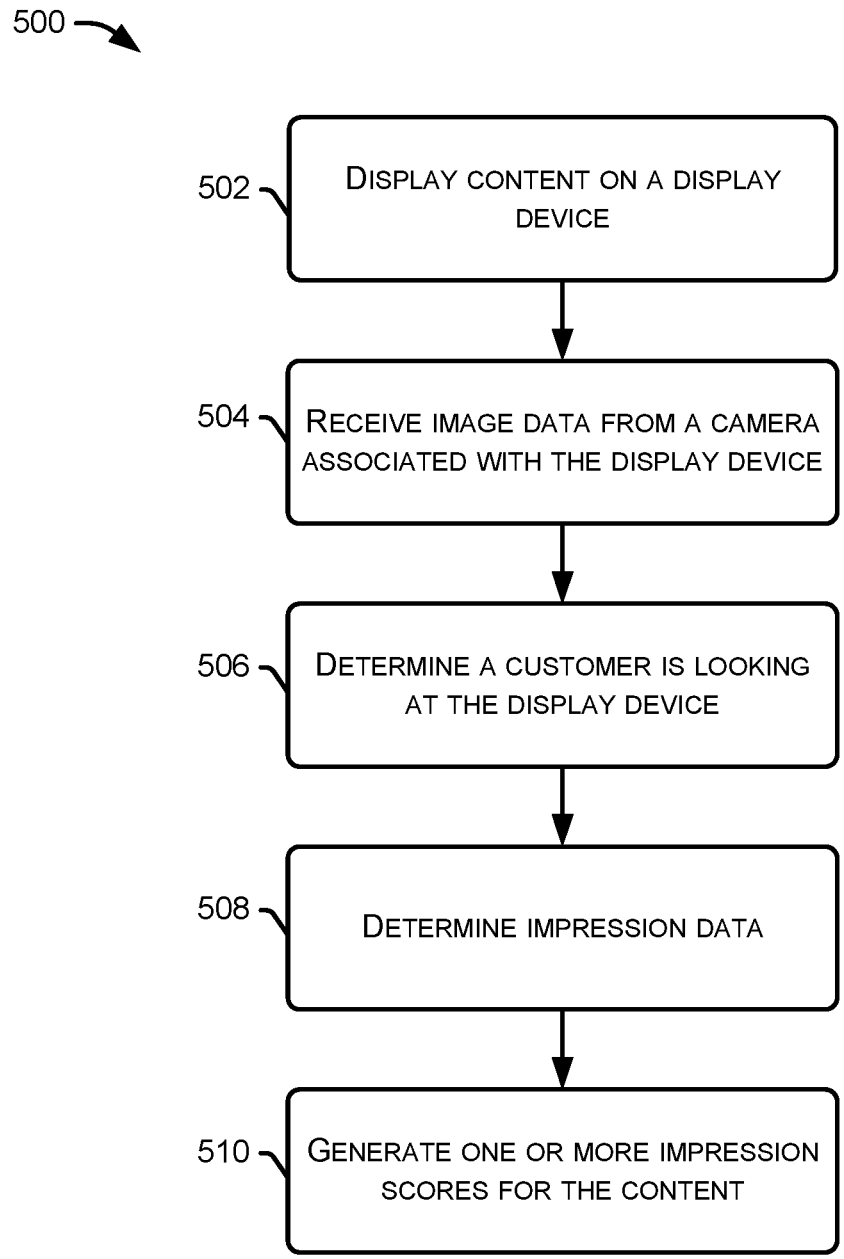
FIG. 5 illustrates a flow diagram depicting a method for generating impression data, according to at least one example.
Figure 6:
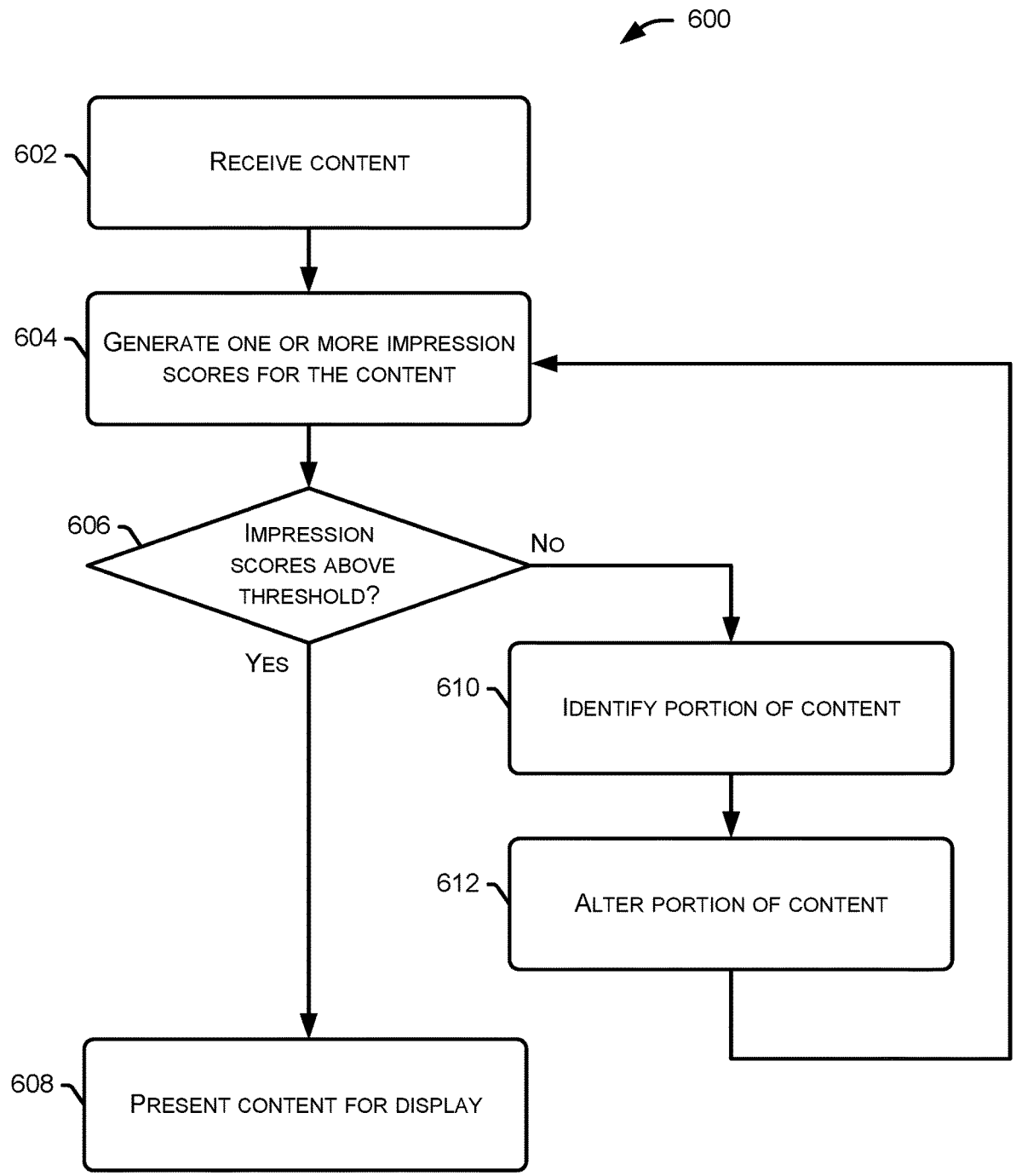
FIG. 6 illustrates a flow diagram depicting a method for refining content using impression data, according to at least one example.

FIGS. 5-6 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 5 illustrates a flow diagram depicting a process 500 for generating impression data, according to at least one example. At 502, the process 500 includes displaying content on a display device. The display device may include the display device 106 and/or display device 304 as described herein and the content may include advertisements, video, audio, text, image, and other such data.

At 504, the process 500 includes receiving image data from a camera associated with the display device. The camera may be built-in to a housing of the display device, retrofitted with the display device, or otherwise associated therewith. The image data may include a person, identified using one or more object recognition techniques.

At 506, the process 500 includes determining that a customer is looking at the display device. The impression module 110 may determine that the customer is looking at the display device based on the image data. In some examples the pose of the body and/or head of the customer may be used for the determination. The determination may be based on receiving data from a machine learning model and/or algorithm based on providing the image data of the person.

At 508, the process 500 includes determining impression data. The impression data may include dwell time, start and end times, areas of interest, and other such information related to where and when the customer is viewing and/or engaging with the content. As described herein, the impression module may determine the impression data using one or more machine learning models and may use the image data to determine instances of impressions on the content by customers. In some examples, the impression data may also include conversion rate data related to associating impressions with purchases of the advertised items by the user viewing the advertisement.

At 510, the process 500 includes generating one or more impression scores for the content on the display device. The impression scores may reflect impressions per segment of the content, for example including "stickiness" as defined herein. The impression scores may indicate or reflect relative interaction or draw to particular portions or segments of the content based on customer impression data.

FIG. 6 illustrates a flow diagram depicting a process 600 for refining content using impression data, according to at least one example. At 602, the process 600 includes receiving content. The content may be generated by a content creator including human and/or algorithm generators of content including advertising, video, audio, text, and/or combinations of the same. In some examples, the content may be generated by an automated process (e.g., a machine learning model) in response to a prompt for creating a particular type or subject of content. In such examples, the process 600 may be used to iteratively improve the content produced by such models. In some examples, the process 600 may be used to refine and/or provide information to content creators regarding stickiness or other measures of effectiveness for content.

At 604, the process 600 includes generating one or more impression scores for the content. The impression scores may be generated as described herein, for example as described with respect to the impression module 110 and/or system 200. At 606, the process 600 includes determining if the impression scores for one or more portions of the content are above a threshold. In some examples the impression scores may be classified as described with respect to system 200. in some examples, the impression scores may be used to divide and/or rank segments or portions of the content according to one or more metrics. At 608, the process 600 includes presenting the content for display at a display device in response to the impression scores being above the threshold at 606. In some examples, the process 600 may include presenting only a portion of the content that has an associated impression score above a threshold.

At 610, the process 600 includes identifying a portion of the content based on the impression scores for the portions in response to one or more of the impression scores associated with the portion being below a threshold. At 612, the process 600 includes altering the portion of the content identified at 610. The alteration may be performed by providing guidance, such as in the form of identifying particular styles or content that may be adjusted within the portion. In some examples, an automated content generation system may alter the identified segment iteratively to increase the impression scores and thereby increase the overall effectiveness or other metrics for the content.

FIG. 7 illustrates a block diagram of a computing device 700 for use in the systems and techniques described herein.

The computing device 700 may include one or more computing devices on which services or modules of this technology may execute. The computing device 700 is illustrated on which a high-level example of the technology may be executed. The computing device 700 may be an example of the computing device 108 of FIG. 1 or other such devices described herein. The computing device 700 may include one or more processors 702 that are in communication with memory devices 710. The computing device 700 may include a local communication interface 708 for the components in the computing device. For example, the local communication interface 708 may be a local data bus and/or any related address or control busses as may be desired.

The memory device 710 may contain modules 708 that are executable by the processor(s) and data for the modules 708. The module 714 may include the modules shown and described with respect to FIG. 3, among others. A data store 712 may also be located in the memory device 710 for storing data related to the modules and other applications along with an operating system that is executable by the processor 702.

The computing device 700 may further include or be in communication with a client device, which may include a display device. The client device may be available for an administrator to use in interfacing with the computing device 700, such as to review operation of a virtual computing instance, make improvements to machine learning models and so forth.

Various applications may be stored in the memory device 710 and may be executable by the processor 702. Components or modules discussed in this description that may be implemented in the form of software using high programming level languages that are compiled, interpreted or executed using a hybrid of the methods.

The computing device 700 may also have access to I/O (input/output) devices 704 that are usable by the computing devices. An example of an I/O device 704 is a display screen that is available to display output from the computing devices. Other known I/O device may be used with the computing device as desired. Networking devices 706 and similar communication devices may be included in the computing device 700. The networking devices 706 may be wired or wireless networking devices 706 that connect to the internet, a LAN, WAN, or other computing network.

The components or modules that are shown as being stored in the memory device 710 may be executed by the processor 702. The term "executable" may mean a program file that is in a form that may be executed by a processor 702. For example, a program in a higher level language may be compiled into machine code in a format that may be loaded into a random access portion of the memory device 710 and executed by the processor 702, or source code may be loaded by another executable program and interpreted to generate instructions in a random access portion of the memory to be executed by a processor 702. The executable program may be stored in any portion or component of the memory device 710. For example, the memory device 710 may be random access memory (RAM), read only memory (ROM), flash memory, a solid-state drive, memory card, a hard drive, optical disk, floppy disk, magnetic tape, or any other memory components.

The processor 702 may represent multiple processors and the memory device 710 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
   a display device configured to provide advertising information, the display device positioned within a retail facility;
   a camera positioned within the retail facility, connected with the display device, and having a field of view comprising a region in front of the display device to capture image data of one or more customers with a line of sight to the display device; and
   a computing device comprising:
   a processor; and
   one or more non-transitory computer-readable medium having instructions stored thereon that, when executed by the processor, cause the processor to perform operations comprising:
   causing the display device to output content;
   receiving image data from the camera associated with the display device;
   determining viewing data describing whether a customer is looking towards the display device based on the image data;
   determining a portion of the content viewed by the customer in response to determining that the customer is looking towards the display device;
   using an object recognition algorithm, identifying a type of object featured in the portion of the content and located on a shelf within the retail facility;
   generating, using one or more machine learning models trained to identify characteristics of types of objects, a content tag for the type of object featured in the portion of the content, the content tag describing the type of object;
   determining an impression count for the portion of the content based on an aggregate of viewing data for portions of the content;

determining an impression ratio for the portion of the content by dividing the impression count for the portion by an average number of impressions over the content;

receiving purchase data for the object, the purchase data associated with a purchase of the object by the customer after viewing the portion of the content; and generating an impression score for the content based on the impression ratio for the portion of the content, the content tag, and the purchase data.

2. The system of claim 1, wherein the impression score for the content comprises a set of scores associated with segments of the content, and wherein the operations further comprise:

determining a subset of the content based on scores associated with the subset of the content exceeding a predetermined threshold;

generating second content by selecting the subset of the content; and displaying the second content on the display device.

3. The system of claim 1, wherein identifying when the customer is looking towards the display device comprises:

determining, based on a pose of the customer, that the customer is viewing the display device; and determining the portion based on a first timestamp when the customer begins viewing the display device and a second timestamp when the customer stops viewing the display device.

4. The system of claim 1, wherein generating the impression score comprises associating the portion of the advertisement with the impression ratio and aggregating the impression ratio with a second impression ratio representing other interactions with the advertisement to identify an effective portion of the advertisement.

5. A method comprising:

causing a display device to output content, the display device positioned within a retail facility;

receiving image data from a camera associated with the display device;

determining viewing data describing whether a customer is looking towards the display device based on the image data;

determining a portion of the content viewed by the customer in response to determining that the customer is looking towards the display device;

using an object recognition algorithm, identifying a type of object featured in the portion of the content and located within the retail facility;

generating, using one or more machine learning models trained to identify characteristics of types of objects, a content tag for the type of object featured in the portion of the content, the content tag describing the type of object;

determining an impression count for the portion of the content based on an aggregate of viewing data for portions of the content;

determining an impression ratio for the portion of the content by dividing the impression count for the portion by an average number of impressions over the content;

receiving purchase data for the object, the purchase data associated with a purchase of the object by the customer after viewing the portion of the content; and generating an impression score for the content based on the impression ratio for the portion of the content, the content tag, and the purchase data.

6. The method of claim 5, wherein determining the portion comprises providing the image data to one or more machine learning models trained to identify when the customer is looking at the display device, wherein the image data comprises a representation of at least part of a body of the customer.

7. The method of claim 5, wherein the impression score for the content comprises a set of scores associated with segments of the content, and wherein the method further comprises displaying a subset of the content based at least in part on the set of scores.

8. The method of claim 5, wherein determining the portion of the content comprises:

determining a crop of at least part of the customer using a first algorithm; and determining, using a second algorithm trained to identify when a person is looking at the camera based on a pose of the customer and by providing the crop of the portion of the customer, when the customer is looking towards the display device.

9. The method of claim 5, further comprising determining demographic data for the customer, and wherein generating the impression score further comprises associating the impression score with the demographic data.

10. The method of claim 5, further comprising:

training a machine learning algorithm with data comprising a plurality of content files labeled with impression score data;

receiving second content; and determining, using the machine learning algorithm, a set of predicted impression scores for the second content.

11. The method of claim 10, further comprising:

identifying a second portion of the second content associated with a predicted impression score of the set of predicted impression scores based on the predicted impression score being below a threshold; and altering the second portion to increase the predicted impression score.

12. A non-transitory computer-readable medium having instructions stored thereon that, when executed by one or more processors, cause the one or more processors to perform operations comprising:

causing a display device to output content, the display device positioned within a retail facility;

receiving image data from a camera associated with the display device;

determining viewing data describing whether a customer is looking towards the display device based on the image data;

determining a portion of the content viewed by the customer in response to determining that the customer is looking towards the display device;

using an object recognition algorithm, identifying a type of object featured in the portion of the content and located on a shelf within the retail facility;

generating, using one or more machine learning models trained to identify characteristics of types of objects, a content tag for the type of object featured in the portion of the content, the content tag describing the type of object;

determining an impression count for the portion of the content based on an aggregate of viewing data for portions of the content;

determining an impression ratio for the portion of the content by dividing the impression count for the portion by an average number of impressions over the content;

receiving purchase data for the object, the purchase data associated with a purchase of the object by the customer after viewing the portion of the content; and generating an impression score for the content based on the impression ratio for the portion of the content, the content tag, and the purchase data.

13. The non-transitory computer-readable medium of claim 12, wherein the operations further comprise:

training a machine learning algorithm with data comprising a plurality of content files labeled with impression score data;

receiving second content; and determining, using the machine learning algorithm, a set of predicted impression scores for the second content.

14. The non-transitory computer-readable medium of claim 13, wherein the operations further comprise:

identifying a second portion of the second content associated with a predicted impression score of the set of predicted impression scores based on the predicted impression score being below a threshold; and altering the second portion to increase the predicted impression score.

15. The non-transitory computer-readable medium of claim 12, wherein determining the portion comprises providing the image data to one or more machine learning models trained to identify when the customer is looking at the camera, wherein the image data comprises a representation of at least part of a body of the customer.

16. The method of claim 5, wherein the retail facility comprises a cashier-less retail facility, and further comprising receiving interaction data for the object featured in the portion of the content, the interaction data associated with the customer picking up the object from the shelf, looking at the object on the shelf, or returning the object to the shelf.

17. The method of claim 5, further comprising based at least in part on determining the type of object featured in the portion of the content and using the object recognition algorithm, determining the type of object is located on a shelf within the retail facility.

18. The method of claim 17, further comprising determining interaction data representing a hand of the customer entering a plane of the shelf and interacting with the type of object located on the shelf, and wherein the purchase data is associated with the interaction data.

19. The non-transitory computer-readable medium of claim 12, wherein the operations further comprise:

based at least in part on determining the type of object featured in the portion of the content and using the object recognition algorithm, determining the type of object is located on a shelf within the retail facility.

20. The non-transitory computer-readable medium of claim 19, wherein the operations further comprise:

determining interaction data representing a hand of the customer entering a plane of the shelf and interacting with the type of object located on the shelf, and wherein the purchase data is associated with the interaction data.

* * * * *